(12) United States Patent
Kim et al.

(10) Patent No.: US 9,464,962 B2
(45) Date of Patent: Oct. 11, 2016

(54) METHOD OF COMPENSATING MURA OF DISPLAY APPARATUS AND VISION INSPECTION APPARATUS PERFORMING THE METHOD

(71) Applicant: Samsung Display Co., LTD., Yongin, Gyeonggi-Do (KR)

(72) Inventors: Se-Yun Kim, Daegu (KR); Hoi-Sik Moon, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 136 days.

(21) Appl. No.: 14/280,976

(22) Filed: May 19, 2014

(65) Prior Publication Data

US 2015/0187289 A1 Jul. 2, 2015

(30) Foreign Application Priority Data

Dec. 30, 2013 (KR) .......................... 10-2013-0166981

(51) Int. Cl.
| | | |
|---|---|---|
| *G01M 11/06* | (2006.01) | |
| *G09G 3/20* | (2006.01) | |
| *G09G 3/36* | (2006.01) | |

(52) U.S. Cl.
CPC .............. *G01M 11/064* (2013.01); *G09G 3/20* (2013.01); *G09G 3/3644* (2013.01); *G09G 2320/0233* (2013.01); *G09G 2320/066* (2013.01); *G09G 2320/0626* (2013.01); *G09G 2320/0666* (2013.01); *G09G 2320/0693* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,440,322 | A | * | 8/1995 | Prince ...................... | G09G 3/20 345/55 |
| 6,154,561 | A | * | 11/2000 | Pratt ....................... | G06T 7/001 345/904 |
| 8,022,908 | B2 | | 9/2011 | Mizukoshi et al. | |
| 8,610,654 | B2 | * | 12/2013 | Kerofsky ............... | G09G 3/006 345/102 |
| 2004/0213449 | A1 | * | 10/2004 | Safaee-Rad ........... | G06T 7/0004 382/141 |
| 2006/0045373 | A1 | * | 3/2006 | Kurumisawa ............ | G09G 3/20 382/254 |
| 2007/0091041 | A1 | * | 4/2007 | Chung ................... | G09G 3/006 345/88 |
| 2007/0182441 | A1 | * | 8/2007 | Hwang ................ | G09G 3/3648 345/204 |

(Continued)

FOREIGN PATENT DOCUMENTS

| | | |
|---|---|---|
| JP | 11-113019 B2 | 4/1999 |
| JP | 2003-108102 B2 | 4/2003 |

(Continued)

*Primary Examiner* — Lun-Yi Lao
*Assistant Examiner* — Kelly B Hegarty
(74) *Attorney, Agent, or Firm* — Cantor Colburn LLP (57) ABSTRACT

A method of compensating a Mura defect of a display apparatus, which includes a display area divided into an upper area and a lower area, includes calculating a sharp grayscale correction value of a predetermined sample grayscale displayed on the display apparatus, where the sharp grayscale correction value is configured to compensate a sharp horizontal Mura between the upper and lower areas, displaying a corrected sample grayscale on the display apparatus based on the predetermined sample grayscale and the sharp grayscale correction value, sensing the corrected sample grayscale displayed on each of a plurality of sample areas defined on the display area based on a Mura type, calculating an intensity profile of the sample grayscale and a target intensity profile configured to compensate the intensity profile of the sample grayscale, calculating a grayscale correction value of the sample area using the intensity profile and the target intensity profile.

20 Claims, 7 Drawing Sheets

(56) References Cited

U.S. PATENT DOCUMENTS

| | | | |
|---|---|---|---|
| 2009/0174628 A1* | 7/2009 | Wang | G09G 3/3225 345/76 |
| 2010/0013751 A1* | 1/2010 | Kerofsky | G09G 3/006 345/89 |
| 2010/0277400 A1* | 11/2010 | Jeong | G09G 3/3275 345/76 |
| 2011/0317935 A1 | 12/2011 | Anan et al. | |
| 2014/0085279 A1* | 3/2014 | Shiomi | G09G 3/2074 345/204 |
| 2014/0092117 A1* | 4/2014 | Yoshimura | G09G 5/02 345/589 |
| 2014/0340431 A1* | 11/2014 | Yamakawa | G09G 3/3426 345/690 |

FOREIGN PATENT DOCUMENTS

| | | |
|---|---|---|
| KR | 1020080037823 A | 5/2008 |
| KR | 1020100012965 A | 2/2010 |
| KR | 1020130090211 A | 8/2013 |

* cited by examiner

GRAY_INTENSITY CURVE

METHOD OF COMPENSATING MURA OF DISPLAY APPARATUS AND VISION INSPECTION APPARATUS PERFORMING THE METHOD

This application claims priority to Korean Patent Application No. 10-2013-0166981 filed on Dec. 30, 2013, and all the benefits accruing therefrom under 35 U.S.C. §119, the content of which in its entirety is herein incorporated by reference.

BACKGROUND

1. Field

Exemplary embodiments of the invention relate to a method of compensating a Mura defect of a display apparatus and a vision inspection apparatus performing the method. More particularly, exemplary embodiments of the invention relate to a method of compensating a Mura defect of a display apparatus for improving a sharp linear Mura and a sidedness intensity difference and a vision inspection apparatus performing the method.

2. Description of the Related Art

In general, a liquid crystal ("LC") display panel includes a lower substrate, an upper substrate opposite to the lower substrate and an LC layer disposed between the lower substrate and the lower substrate. The lower substrate includes a pixel area in which a pixel is defined, and a peripheral area for receiving a driving signal which is applied to the pixel.

A data line, a gate line and a pixel electrode are disposed in the pixel area. The data line extends in a first direction, the gate line extends in a second direction crossing the first direction, and the pixel electrode is connected to the data line and the gate line. A first driving chip pad and a second driving chip pad are typically disposed in the peripheral area. The first driving chip pad may receive a data signal, and the second driving chip pad may receive a gate signal.

During a manufacturing process of a LC display panel, after providing the LC layer between the lower substrate and the lower substrate, the LC panel is typically tested through a visual test process which tests electrical and optical operations of the LC panel. In general, the visual test process tests include testing various pattern stains using a tester's eyes and removing the various pattern stains using a stain remover algorithm based on a tested result. As described above, the various pattern stains are manually tested by the tester, which increases a test process period is increased and an identification differences of the testers. Thus, productivity may be decreased and compensation error may be increased.

SUMMARY

Exemplary embodiments of the invention provide a method of compensating a Mura defect of a display apparatus for improving a sharp linear Mura and a sidedness intensity difference.

Exemplary embodiments of the invention provide a vision inspection apparatus performing the method of compensating the Mura defect.

According to an exemplary embodiment of the invention, a method of compensating Mura of a display apparatus, which includes a display area divided into an upper area and a lower area that are driven independently of each other, includes calculating a sharp grayscale correction value of a predetermined sample grayscale displayed on the display apparatus, where the sharp grayscale correction value is configured to compensate a sharp horizontal Mura in a boundary area between the upper and lower areas, displaying a corrected sample grayscale on the display apparatus based on the predetermined sample grayscale and the sharp grayscale correction value, sensing the corrected sample grayscale displayed on each of a plurality of sample areas, where the sample areas are defined on the display area based on a Mura type, calculating an intensity profile of the corrected sample grayscale and a target intensity profile which is configured to compensate the intensity profile of the corrected sample grayscale, calculating a grayscale correction value of the sample area using the intensity profile and the target intensity profile, and applying the sharp grayscale correction value to the grayscale correction value.

In an exemplary embodiment, the calculating the sharp grayscale correction value displayed on the display apparatus may include sensing the predetermined sample grayscale displayed on each sample area and sensing an adjacent sample grayscale of the predetermined sample grayscale displayed on each sample area, and calculating the sharp grayscale correction value of the predetermined sample grayscale using an intensity value of the predetermined sample grayscale, an intensity value of the adjacent sample grayscale, a piecewise gamma between the predetermined sample grayscale and the adjacent sample grayscale and a target intensity value.

In an exemplary embodiment, the calculating the sharp grayscale correction value using the intensity value of the predetermined sample grayscale, the intensity value of the adjacent sample grayscale, the piecewise gamma between the predetermined sample grayscale and the adjacent sample grayscale and the target intensity value may include calculating a first sharp grayscale correction value corresponding to a last pixel row of the upper area by setting the target intensity value as an average intensity value of pixels in a pixel row of the upper area adjacent to the last pixel row of the upper areas, and calculating a second sharp grayscale correction value corresponding to the last pixel row of the upper area by setting the target intensity value as an average intensity value of pixels in a pixel row of the lower area adjacent to a first pixel row of the lower area.

In an exemplary embodiment, the calculating the sharp grayscale correction value using the intensity value of the predetermined sample grayscale, the intensity value of the adjacent sample grayscale, the piecewise gamma between the predetermined sample grayscale and the adjacent sample grayscale and the target intensity value may further include calculating a sharp grayscale correction value of another sample, which is different from the predetermined sample grayscale, using an adaptive offset ratio with respect to the predetermined sample grayscale.

In an exemplary embodiment, the sample areas may include a plurality of vertical sample areas and a plurality of horizontal sample areas, and the sensing the corrected sample grayscale displayed on each of the sample areas may include sensing the corrected sample grayscale displayed on each of the vertical sample areas, and sensing the corrected sample grayscale displayed on each of the horizontal sample areas.

In an exemplary embodiment, the sharp grayscale correction value may be calculated for each vertical sample area.

In an exemplary embodiment, the calculating the intensity profile of the corrected sample grayscale and the target intensity profile may include calculating a vertical intensity profile of the corrected sample grayscale sensed from each vertical sample area and a vertical target intensity profile which is configured to compensate the vertical intensity profile, and the calculating the grayscale correction value of the sample area using the intensity profile and the target intensity profile may include calculating a vertical grayscale correction value based on the vertical intensity profile and the vertical target intensity profile.

In an exemplary embodiment, the vertical grayscale correction value may include grayscale correction values of pixels in a pixel column, and the applying the sharp grayscale correction value may include adding a first sharp grayscale correction value to a grayscale correction value of a pixel in a last pixel row of the upper area and adding a second sharp grayscale correction value to a grayscale correction value of a pixel in a first pixel row of the lower area.

In an exemplary embodiment, the calculating the intensity profile of the corrected sample grayscale and the target intensity profile may include calculating a horizontal intensity profile of the corrected sample grayscale sensed from each horizontal sample area and the horizontal target intensity profile which is configured to compensate the horizontal intensity profile, and the calculating the grayscale correction value of the sample area using the intensity profile and the target intensity profile may include calculating a horizontal grayscale correction value based on the horizontal intensity profile and the horizontal target intensity profile.

In an exemplary embodiment, a horizontal sample area adjacent to a boundary area between the upper and lower areas may have a size smaller than a size of a horizontal sample area far away from the boundary area.

In an exemplary embodiment, the calculating the horizontal grayscale correction value based on the horizontal intensity profile and the horizontal target intensity profile may include calculating horizontal grayscale correction values of a first horizontal sample area in the upper area adjacent to the boundary area and a second horizontal sample area in the lower area adjacent to the boundary area based on a same horizontal target intensity profile, where the horizontal grayscale correction value may include grayscale correction values of the pixels in the pixel row.

According to an exemplary embodiment of the invention, a vision inspection apparatus includes a sensing part configured to sense a sample grayscale displayed on a display apparatus, where the display apparatus includes a display area divided into an upper area and a lower area that are driven independently of each other, a sharp Mura compensation part configured to calculate a sharp grayscale correction value of a predetermined sample grayscale, where the sharp grayscale correction value is configured to compensate a sharp horizontal Mura in a boundary area between the upper and lower areas, an inspection control part configured to control the sensing part to sense the sample grayscale displayed on each of a plurality of sample areas defined on the display area based on a Mura type and to display a corrected sample grayscale on the display apparatus based on the predetermined sample grayscale and the sharp grayscale correction value, an intensity calculation part configured to calculate an intensity profile of the corrected sample grayscale and a target intensity profile which is configured to compensate the intensity profile of the corrected sample grayscale, a correction calculation part configured to calculate a grayscale correction value of the sample area using the intensity profile and the target intensity profile, and an addition part configured to add the sharp grayscale correction value to the grayscale correction value.

In an exemplary embodiment, the sharp Mura compensation part may be configured to calculate the sharp grayscale correction value of the predetermined sample grayscale using an intensity value of the predetermined sample grayscale, an intensity value of the adjacent sample grayscale, a piecewise gamma between the predetermined sample grayscale and the adjacent sample grayscale and a target intensity value.

In an exemplary embodiment, the sharp Mura compensation part may be configured to calculate a first sharp grayscale correction value corresponding to a last pixel row of the upper area by setting the target intensity value as an average intensity value of pixels in a pixel row of the upper area adjacent to the last pixel row of the upper area and the sharp Mura compensation part may be configured to calculate a second sharp grayscale correction value corresponding to the last pixel row of the upper area by setting the target intensity value as an average intensity value of pixels in a pixel row of the lower area adjacent to a first pixel row of the lower area.

In an exemplary embodiment, the sharp Mura compensation part may be configured to calculate a sharp grayscale correction value of another sample grayscale, which is different from the predetermined sample grayscale, using an adaptive offset ratio with respect to the predetermined sample grayscale.

In an exemplary embodiment, the sample areas may include a plurality of vertical sample areas, the intensity calculation part may be configured to calculate a vertical intensity profile of the corrected sample grayscale sensed from each vertical sample area and a vertical target intensity profile which is configured to compensate the vertical intensity profile and the correction calculation part is configured to calculate a vertical grayscale correction value based on the vertical intensity profile and the vertical target intensity profile.

In an exemplary embodiment, the vertical grayscale correction value may include grayscale correction values of pixels in a pixel column, and the addition part may be configured to add a first sharp grayscale correction value to a grayscale correction value of a pixel in a last pixel row of the upper area and add a second sharp grayscale correction value to a grayscale correction value of a pixel in a first pixel row in the lower area.

In an exemplary embodiment, the sample areas may include a plurality of horizontal sample areas, the intensity calculation part may be configured to calculate a horizontal intensity profile of the corrected sample grayscale sensed from each horizontal sample area and the horizontal target intensity profile which is configured to compensate the horizontal intensity profile and the correction calculation part may be configured to calculate a horizontal grayscale correction value based on the horizontal intensity profile and the horizontal target intensity profile.

In an exemplary embodiment, a horizontal sample area adjacent to a boundary area between the upper and lower areas may have a size smaller than a size of a horizontal sample area far away from the boundary area.

In an exemplary embodiment, the correction calculation part may be configured to calculate horizontal grayscale correction values of a first horizontal sample area of the upper area adjacent to the boundary area and a second horizontal sample area of the lower area adjacent to the boundary area based on a same horizontal target intensity profile.

According to exemplary embodiments of the invention, the sharp horizontal Mura and the sidedness intensity difference, which may occur in the half-cut boundary area of the display apparatus such as an ultra high definition ("UHD"), may be improved.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in detail with reference to the accompanying drawings.

Figure 1:
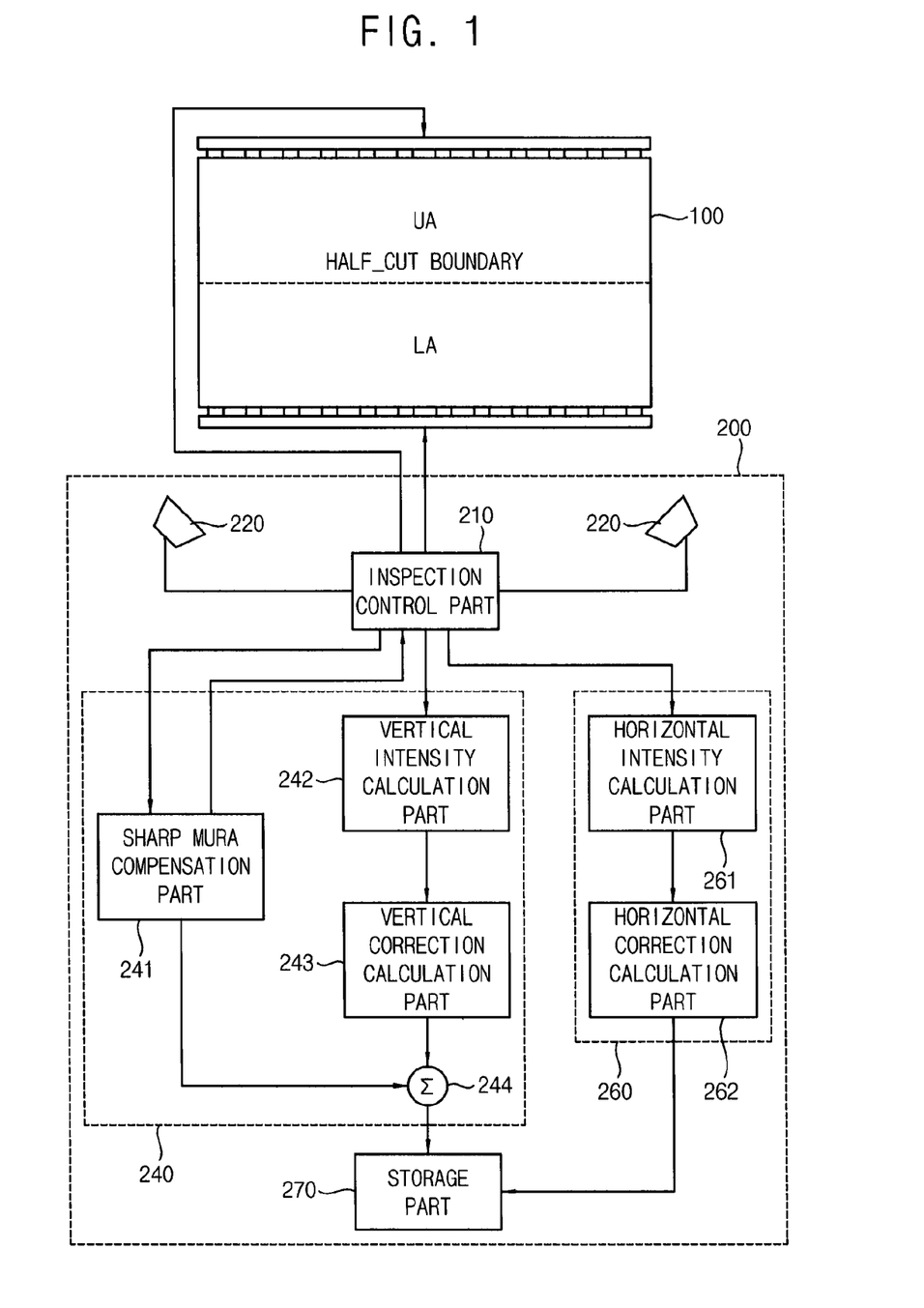
FIG. 1 is a block diagram illustrating an exemplary embodiment of a vision inspection apparatus according to the invention.
Figure 2:
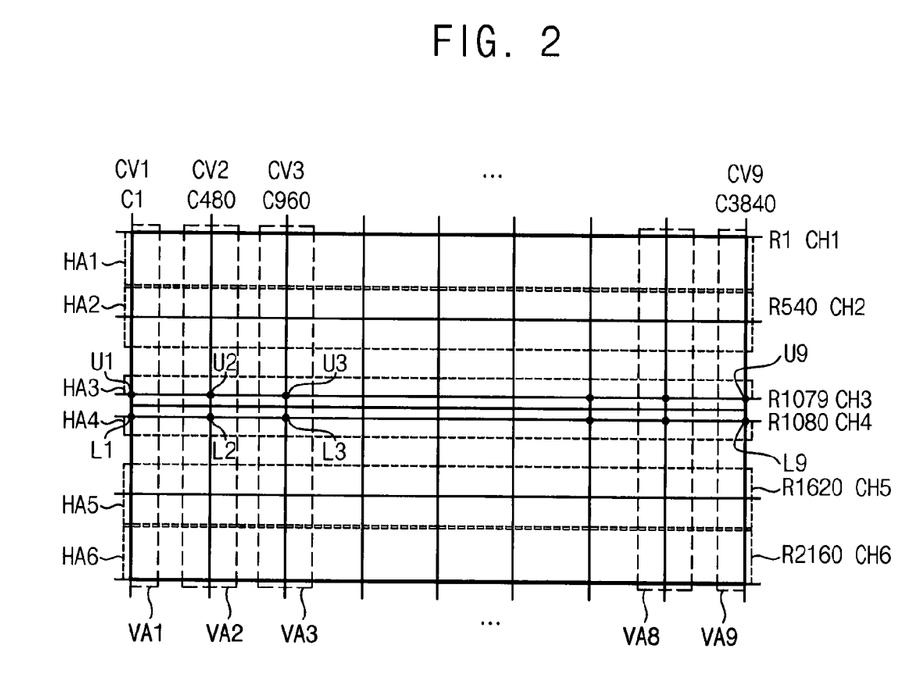
FIG. 2 is a conceptual diagram illustrating a pixel position corresponding to a correction value calculated from the vision inspection apparatus of FIG. 1.

FIG. 1 is a block diagram illustrating an exemplary embodiment of a vision inspection apparatus according to the invention. FIG. 2 is a conceptual diagram illustrating a pixel position corresponding to a correction value calculated from the vision inspection apparatus of FIG. 1.

Referring to FIGS. 1 and 2, an exemplary embodiment of the vision inspection apparatus 200 may calculate a correction value, which is used to compensate a horizontal Mura and a vertical Mura of a display apparatus 100.

The display apparatus 100 has a resolution of an ultra high definition ("UHD"), for example, a resolution of 3840× 2160. The display apparatus 100 has a display area in which a plurality of pixels corresponding to the UHD is arranged. The display area is divided into an upper area UA and a lower area LA with respect to an imaginary center line along an extending direction of a gate line. The display apparatus 100 individually drive the upper area and the lower area. In such a display apparatus 100, the upper area and the lower area may be driven independently of each other, e.g., the upper area and the lower area may be driven based on an upper-lower division driving mode.

When the upper area and the lower area are driven based on the upper-lower division driving mode, the display apparatus 100 may have a sharp horizontal Mura observed in a half-cut boundary area, which is a boundary area between the upper area UA and the lower area LA. When the upper area and the lower area are driven based on the upper-lower division driving mode, the display apparatus 100 may have a sidedness intensity difference observed in the half-cut boundary area. The sidedness intensity difference may occur by an intensity difference between the upper and lower areas UA and LA. The horizontal Mura may include the sharp horizontal Mura of the half-cut boundary area and the vertical Mura may include the sidedness intensity difference.

In an exemplary embodiment, the vision inspection apparatus 200 may include an inspection control part 210, a sensing part 220, a horizontal Mura compensation part 240, a vertical Mura compensation part 260 and a storage part 270.

The inspection control part 210 is configured to control an operation of the vision inspection apparatus 200. In one exemplary embodiment, for example, the inspection control part 210 is configured to display a sample grayscale sampled among total grayscales.

In one exemplary embodiment, for example, when the total gray scales are 256 grayscales, the sample grayscale may be a 0-grayscale, a 16-grayscale, a 24-grayscale, a 32-grayscale, a 64-grayscale, a 128-grayscale, a 160-grayscale, a 192-grayscale, a 224-grayscale and a 255-grayscale. In such an embodiment, the sample grayscales may be set variably, randomly, according to pattern, etc. In such an embodiment, any suitable range of grayscales may be utilized, as well as any suitable number of sample grayscales within the total grayscales.

The inspection control part 210 displays at least two sample grayscales on the display apparatus 100 in a sharp Mura compensation mode. In one exemplary embodiment, for example, the at least two sample grayscales includes the 24-grayscale, on which the sharp Mura is frequently observed, and the 32-grayscale which is substantially close to the 24-grayscale. Thus, inspection control part 210 displays the 24-grayscale and the 32-grayscale on the display apparatus in the sharp Mura compensation mode. The inspection control part 210 displays a plurality of sample grayscales, for example, the 0-grayscale, the 16-grayscale, the 24-grayscale, the 32-grayscale, the 64-grayscale, the 96-grayscale, the 128-grayscale, the 192-grayscale and the 255-grayscale, in the horizontal Mura compensation mode and a vertical Mura compensation mode.

The sensing part 220 senses the sample grayscale displayed on the display apparatus 100. The sensing part 220 may include an image sensing or photo sensing device, e.g., a charge-coupled device ("CCD") camera.

The sensing part 220 is configured to sense images displayed on a plurality of sample areas defined on the display area of the display apparatus 100 based on a Mura type, e.g., a shape or pattern of Mura that occurs in the display apparatus 100. In an exemplary embodiment, the sensing part 220 may divide the display area into a plurality of sample areas corresponding to vertical and horizontal Mura compensation modes based on a control of the inspection control part 210, and sense the sample grayscale displayed on the sample area.

In an exemplary embodiment, as shown in FIG. 2, the display area of the display apparatus 100 is divided into a plurality of vertical sample areas VA1, . . . , VA9 or a plurality of horizontal sample areas HA1, . . . , HA6 according to the vertical and horizontal Mura compensation modes. In the horizontal Mura compensation mode, the sample grayscale in each vertical sample area is sensed, and in the vertical Mura compensation mode, the sample grayscale in each vertical sample area is sensed.

In an exemplary embodiment, a size of the horizontal sample area HA3 or HA4 adjacent to the half-cut boundary area is less than a size of the horizontal sample area HA1, HA2, HA5 or HA6 distant from the half-cut boundary area. The horizontal sample areas HA3 and HA4 adjacent to the half-cut boundary area may have substantially a same size as each other, and the horizontal sample areas HA1, HA2, HA5 and HA6 distant from the half-cut boundary area may have substantially a same size as each other.

The horizontal Mura compensation part 240 calculates a vertical grayscale correction value, which is used to compensate the horizontal Mura. The vertical grayscale correction value is calculated for each vertical sample area. The vertical grayscale correction value includes a plurality of grayscale correction values corresponding to a plurality of pixels in a pixel column that overlaps a vertical position set in the vertical sample area.

As shown in FIG. 2, a vertical grayscale correction value of a first vertical sample area VA1 includes a plurality of grayscale correction values corresponding to a plurality of pixels of a first pixel column C1 that overlaps a first vertical position CV1 of the first vertical sample area VA1. A vertical grayscale correction value of a second vertical sample area VA2 includes a plurality of grayscale correction values corresponding to a plurality of pixels of a 480-th pixel column C480 that overlaps a second vertical position CV2 of the second vertical sample area VA2. A vertical grayscale correction value of a third vertical sample area VA3 includes a plurality of grayscale correction values corresponding to a plurality of pixels of a 960-th pixel column C960 that overlaps a third vertical position CV3 of the third vertical sample area VA3. As described above, a vertical grayscale correction value of a ninth vertical sample area VA9 includes a plurality of grayscale correction values corresponding to a plurality of pixels of a 3840-th pixel column C3840 that overlaps a ninth vertical position CV9 of the ninth vertical sample area VA9.

In an exemplary embodiment, as shown in FIG. 1, the horizontal Mura compensation part 240 includes a sharp Mura compensation part 241, a vertical intensity calculation part 242, a vertical correction calculation part 243 and addition part 244.

In such an embodiment, the sharp Mura compensation part 241 calculates a sharp grayscale correction value, which is used to compensate the sharp horizontal Mura of the half-cut boundary area. Thus, the sharp horizontal Mura compensated by the sharp grayscale correction value may be corrected as a normal Mura, which is sensed by the sensing part 220.

The sharp grayscale correction value is calculated for each vertical sample area. The sharp grayscale correction value includes a first sharp grayscale correction value applied to a pixel corresponding the last pixel row in the upper area UA and a second sharp grayscale correction value applied to a pixel corresponding to a first pixel row in the lower area LA.

In an exemplary embodiment, as shown in FIG. 2, a sharp grayscale correction value of the first vertical sample area VA1 includes a first sharp grayscale correction value applied to a pixel U1 corresponding to the first vertical position CV1 among pixels of a 1079-th pixel row in the upper area UA and a second sharp grayscale correction value applied to a pixel L1 corresponding to the first vertical position CV1 among pixels of a 1080-th pixel row in the lower area LA. A sharp grayscale correction value of the second vertical sample area VA2 includes a first sharp grayscale correction value applied to a pixel U2 corresponding to the second vertical position CV2 among the pixels of the 1079-th pixel row in the upper area UA and a second sharp grayscale correction value applied to a pixel L2 corresponding to the second vertical position CV2 among the pixels of the 1080-th pixel row in the lower area LA. A sharp grayscale correction value of the third vertical sample area VA3 includes a first sharp grayscale correction value applied to a pixel U3 corresponding to the third vertical position CV3 among the pixels of the 1079-th pixel row in the upper area UA and a second sharp grayscale correction value applied to a pixel L3 corresponding to the third vertical position CV3 among the pixels of the 1080-th pixel row in the lower area LA. As described above, a sharp grayscale correction value of the ninth vertical sample area VA9 includes a first sharp grayscale correction value applied to a pixel U9 corresponding to the third vertical position CV3 among the pixels of the 1079-th pixel row in the upper area UA and a second sharp grayscale correction value applied to a pixel L9 corresponding to the ninth vertical sample area VA9 among the pixels of the 1080-th pixel row in the lower area LA.

The sharp Mura compensation part 241 calculates a sharp grayscale correction value of the predetermined sample grayscale and then calculates a sharp grayscale correction value of another sample grayscale, e.g., a remaining sample grayscale except for the predetermined sample grayscale, using an adaptive offset ratio with respect to the predetermined sample grayscale.

The inspection control part 210 displays the plurality of corrected sample grayscales, which are corrected based on the sharp grayscale correction value, on the display apparatus 100.

The sharp Mura compensation part 241 provides the addition part 244 with a plurality of sharp grayscale correction values corresponding to the plurality of corrected sample grayscales, respectively.

The vertical intensity calculation part 242 calculates a vertical intensity profile of the corrected sample grayscale sensed from each vertical sample area and a vertical target intensity profile from the vertical intensity profile. The vertical intensity profile may be an average intensity profile of the sample grayscale. The vertical target intensity profile may be calculated based on a 4-order polynomial approximation of the vertical intensity profile.

The vertical correction calculation part 243 calculates a first Mura grayscale-intensity curve and a first target grayscale-intensity curve of each vertical sample area using a plurality of vertical intensity profiles and a plurality of vertical target intensity profiles.

The vertical correction calculation part 243 calculates a plurality of grayscale correction values, which is respectively corresponding to the plurality of sample grayscale of each vertical sample area, using the first Mura grayscale-intensity curve and the first target grayscale-intensity curve.

In one exemplary embodiment, for example, the grayscale correction values of the first vertical sample area VA1 includes grayscale correction values of pixels in the first pixel column C1 corresponding to the first vertical position CV1. The grayscale correction values of the second vertical sample area VA2 includes grayscale correction values of pixels in the 480-th pixel column C480 corresponding to the second vertical position CV2. The grayscale correction values of the third vertical sample area VA3 includes grayscale correction values of pixels in the 960-th pixel column C960 corresponding to the third vertical position CV3. As described above, the grayscale correction values of the ninth vertical sample area VA9 includes grayscale correction values of pixels in the 3840-th pixel column C3840 corresponding to the ninth vertical position CV9. The number of the grayscale correction value corresponding to each vertical sample area may be determined based on the number of the pixels included in the pixel column and the number of the corrected sample grayscales.

The vertical correction calculation part 243 provides the plurality of grayscale correction values calculated by each vertical sample area with the addition part 244.

The addition part 244 adds the first and second sharp grayscale correction values, which are calculated by each vertical sample area, to the plurality of grayscale correction values corresponding to the pixels of the last pixel row of the upper area UA and the first pixel row of the lower area LA, and thus calculates the vertical grayscale correction values.

In one exemplary embodiment, for example, the first and second sharp grayscale correction values, which are sharp grayscale correction values corresponding to the 24-grayscale calculated from the first vertical sample area VA1, are added to the grayscale correction values of the pixels respectively corresponding to the 1079-th and 1080-th pixel rows among the grayscale correction values of the 24 grayscale calculated from the first vertical sample area VA1.

The vertical grayscale correction values calculated from the addition part 244 include 2160 grayscale correction values corresponding to the number of the pixels included in the pixel column, and 1079-th and 1080-th grayscale correction values corresponding to the 1079-th and 1080-th pixel rows among the 2160 grayscale correction values are values with added the first and second sharp grayscale correction values.

The storage part 270 stores the plurality of vertical grayscale correction values corresponding to the plurality of corrected sample grayscales calculated for each vertical sample area from the addition part 244.

The vertical Mura compensation part 260 calculates a horizontal grayscale correction value which is used to compensate the vertical Mura. The horizontal grayscale correction value is calculated for each horizontal sample area and includes a plurality of grayscale correction values applied to pixels in a pixel row that overlaps a horizontal position set in each horizontal sample area.

In one exemplary embodiment, for example, the vertical Mura compensation part 260 may include a horizontal intensity calculation part 261 and a horizontal correction calculation part 262.

The horizontal intensity calculation part 261 calculates a horizontal intensity profile and a horizontal target intensity profile based on the sample grayscale sensed from each horizontal sample area. The horizontal intensity profile may be an average intensity profile of the sample grayscale. The horizontal target intensity profile may be calculated based on a 4-order polynomial approximation of the horizontal intensity profile.

The horizontal correction calculation part 262 calculates a second Mura grayscale-intensity curve and a second target grayscale-intensity curve of each horizontal sample area using a plurality of horizontal intensity profiles and a plurality of horizontal target intensity profiles.

The horizontal correction calculation part 262 calculates a plurality of horizontal grayscale correction values, respectively corresponding to the plurality of sample grayscale of each horizontal sample area, using the second Mura grayscale-intensity curve and the second target grayscale-intensity curve.

In an exemplary embodiment, as shown in FIG. 2, the horizontal grayscale correction values of a first horizontal sample area HA1 includes grayscale correction values of pixels in a first pixel row R1 corresponding to a first horizontal position CH1. The horizontal grayscale correction values of a second horizontal sample area HA2 includes grayscale correction values of pixels in a 540-th pixel row R540 corresponding to a second horizontal position CH2. The horizontal grayscale correction values of a third horizontal sample area HA3 includes grayscale correction values of pixels in a 1079-th pixel row R1079 corresponding to a third horizontal position CH3. The horizontal grayscale correction values of a fourth horizontal sample area HA4 includes grayscale correction values of pixels in a 1080-th pixel row R1080 corresponding to a fourth horizontal position CH4. The horizontal grayscale correction values of a fifth horizontal sample area HA5 includes grayscale correction values of pixels in a 1620-th pixel row R1620 corresponding to a fifth horizontal position CH5. The horizontal grayscale correction values of a sixth horizontal sample area HA6 includes grayscale correction values of pixels in a 2160-th pixel row R2160 corresponding to a sixth horizontal position CH6. The number of the grayscale correction value corresponding to each horizontal sample area may be determined based on the number of the pixels included in the pixel row and the number of the corrected sample grayscales.

In an exemplary embodiment, referring to FIG. 2, the horizontal grayscale correction value of the third and fourth horizontal sample areas CH3 and CH4 adjacent to the half-cut boundary area are calculated based on a same horizontal target intensity profile such that a sidedness intensity difference of the display apparatus may be compensated. Thus, in such an embodiment, an intensity difference between the third horizontal sample area CH3 of the upper area UA and the fourth horizontal sample area CH4 of the lower area LA may be decreased such that the sidedness intensity difference may be decreased.

The storage part 270 stores the plurality of horizontal grayscale correction values corresponding to the plurality of corrected sample grayscales calculated for each horizontal sample area from the horizontal correction calculation part 262.

In one exemplary embodiment, for example, referring to FIG. 2, the storage part 270 may store $\{P \times M + Q \times N\} \times K$ grayscale correction values. Herein, P denotes the number of the vertical sample areas, M denotes the number of the pixels in a pixel column, Q denotes the number of the horizontal sample areas, N denotes the number of the pixels in a pixel row, and K denotes the number of the corrected sample grayscales.

Figure 3:
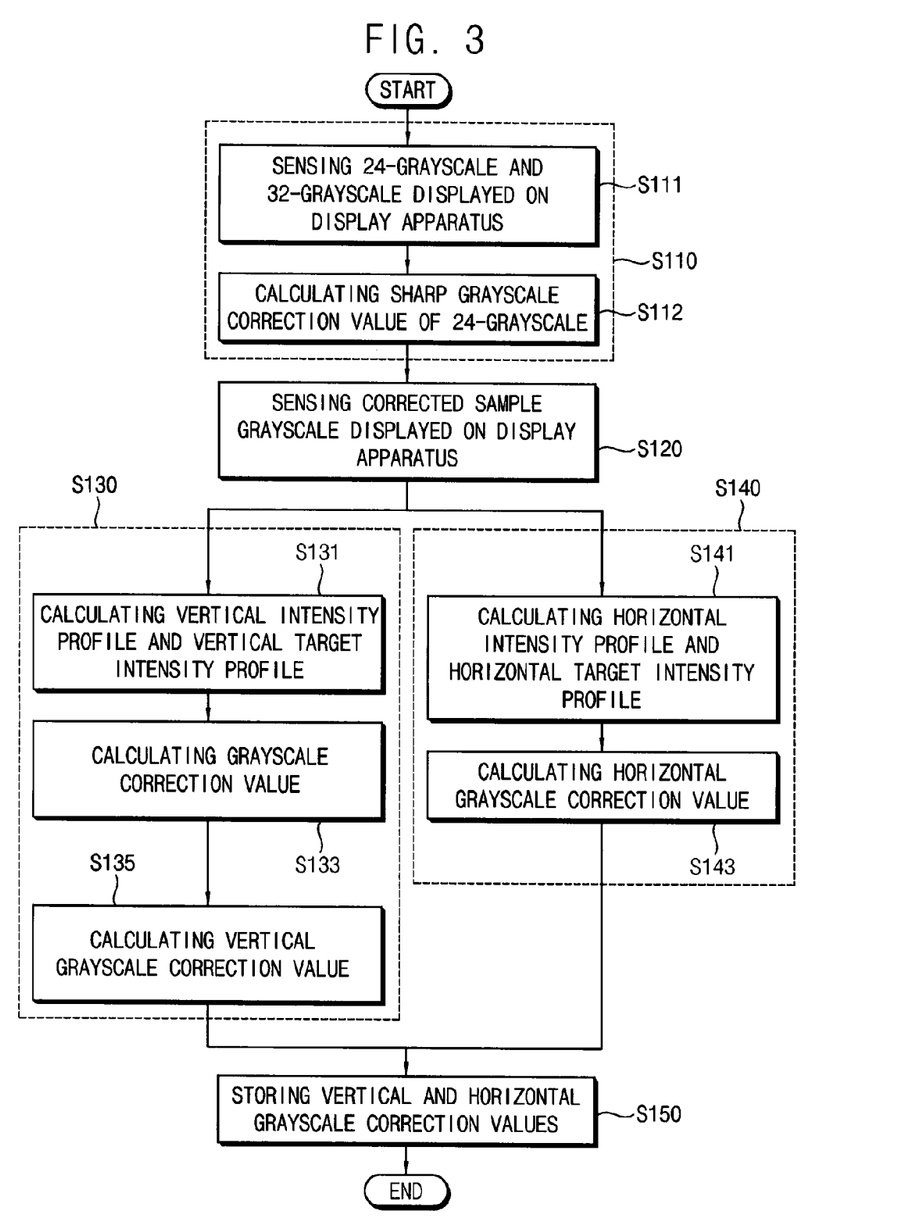
FIG. 3 is a flowchart illustrating an exemplary embodiment of a method of compensating Mura according to the vision inspection apparatus of FIG. 1.
Figure 4:
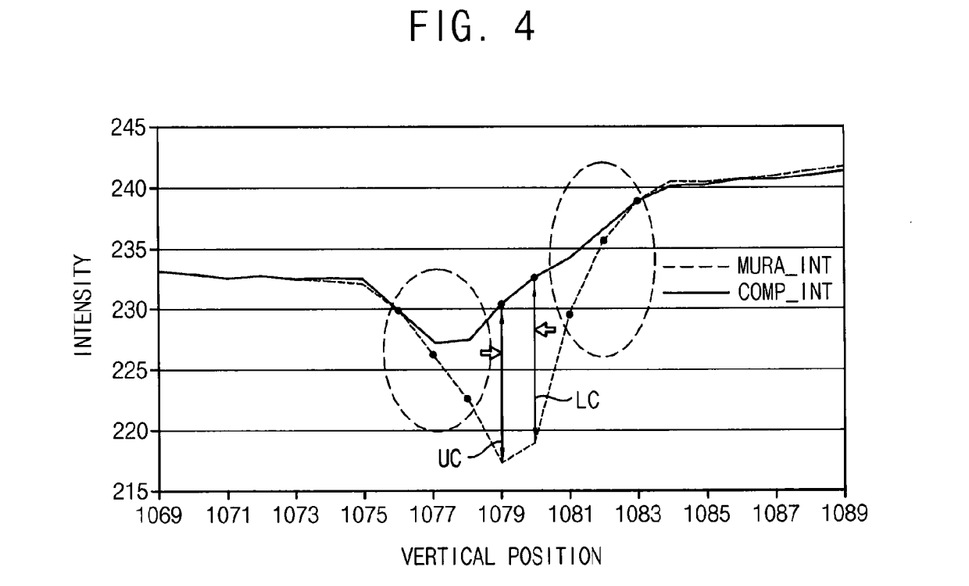
FIG. 4 is a conceptual diagram illustrating an intensity profile to explain an exemplary embodiment of a method of compensating a sharp linear Mura of FIG. 3.

FIG. 3 is a flowchart illustrating an exemplary embodiment of a method of compensating Mura according to the vision inspection apparatus of FIG. 1. FIG. 4 is a conceptual diagram illustrating an intensity profile to explain an exemplary embodiment of a method of compensating a sharp linear Mura of FIG. 3.

Referring to FIGS. 1, 3 and 4, an exemplary embodiment of a method of compensating a sharp Mura (S110) will hereinafter be described.

The inspection control part 210 displays a predetermined sample grayscale and an adjacent sample grayscale substantially close to the predetermined sample grayscale on the display apparatus 100. The predetermined sample grayscale may be set as a sample grayscale, on which the sharp Mura is frequently observed. The adjacent sample grayscale may be set as a sample grayscale higher than the predetermined sample grayscale.

Hereinafter, an exemplary embodiment, where the predetermined sample grayscale is set as the 24 grayscale and the adjacent sample grayscale is set as 32 grayscale, will be described.

In such an embodiment, the inspection control part 210 sequentially displays the 24 grayscale and the 32 grayscale on the display apparatus 100. The sensing part 220 senses the 24 grayscale and the 32 grayscale displayed on each vertical sample area (S111).

The sharp Mura compensation part 241 calculates the sharp grayscale correction value of the 24 grayscale for each vertical sample area, using the 24 grayscale and the 32 grayscale sensed from the sensing part 220. The sharp grayscale correction value includes a first sharp grayscale correction value applied to a pixel corresponding to the vertical position of the last pixel row in the upper area UA and a second sharp grayscale correction value applied to a pixel corresponding to the vertical position of a first pixel row of the lower area LA (S112).

The sharp grayscale correction value (Adaptive_offset$_{Gray}$) of the 24 grayscale is calculated as the following Expression 1.

Expression 1

$$\text{Adaptive\_Offset}_{Gray} = \left(\frac{Tgt_{intensity}}{Const_{intensity}}\right)^{\frac{1}{GMA_{pw}}} * \max_{Gray}$$

$$GMA_{pw} = \frac{\log\left(\frac{Intensity_{24\_Gray}}{Intensity_{32\_Gray}}\right)}{\log\left(\frac{24/255}{32/255}\right)}$$

$$Const_{Intensity} = \frac{Intensity_{24\_Gray}}{\left(\frac{24}{\max_{Gray}}\right)^{GMA_{pw}}}$$

Herein, a target intensity value ($Tgt_{intensity}$) denotes an average intensity value of adjacent pixels, an $Intensity_{24\_Gray}$ denotes an intensity value of the 24 grayscale sensed by the sensing part, an $Intensity_{32\_Gray}$ denotes an intensity value of the 32 grayscale sensed by the sensing part, and a $max_{Gray}$ denote a maximum grayscale. A $GMA_{pw}$ denotes a piecewise gamma value between the 24 grayscale and the 32 grayscale. In an exemplary embodiment, the $intensity_{2\_Gray}$ may be an average intensity value of the 24 grayscale displayed on the vertical sample area the $intensity_{32\_Gray}$ may be an average intensity value of the 32 grayscale displayed on the vertical sample area, and the $max_{Gray}$ may be the 255 grayscale.

FIG. 4 is a conceptual diagram illustrating an intensity profile to explain an exemplary embodiment of a method of compensating a sharp linear Mura of FIG. 3.

Referring to FIG. 4, the Mura intensity profile MURA_INT is sharply decreased in the half-cut boundary area, in which the last pixel row (1079-th pixel row) of the upper area UA and the first pixel row (1080-th pixel row) of the lower area LA are located.

The sharp Mura compensation part 241 calculates a first sharp grayscale correction value UC corresponding to the last pixel row (1079-th pixel row) and a second sharp grayscale correction value LC corresponding to the first pixel row (1080-th pixel row) based on Expression 1.

In such an embodiment, the target intensity value ($Tgt_{intensity}$) for calculating the first sharp grayscale correction value UC may be determined as an average intensity value of the pixel rows adjacent to the last pixel row (1079-th pixel row), for example, 1076-th to 1078-th pixel rows. In such an embodiment, the target intensity value ($Tgt_{intensity}$) for calculating the second sharp grayscale correction value LC may be determined as the average intensity value of the pixel rows adjacent to the first pixel row (1080-th pixel row), for example, 1081-th to 1083-th pixel rows.

The sharp Mura compensation part 241 calculates the sharp grayscale correction value of a reminding sample grayscale except for the 24-grayscale using an adaptive offset ratio, which is an experimental value.

The adaptive offset ratio may be defined as the following Table 1.

TABLE 1

| Compensation Gray (Full white: 255) | 8 | 16 | 24 | 32 | 40 | 48 | 64 | 96 | 128 | 192 |
|---|---|---|---|---|---|---|---|---|---|---|
| Adaptive Offset Ratio by 24 Gray's one at Compensation Gray | | | | | | | | | | |
| At vertical 1079, 1080 Position | 0.6 | 0.8 | 1.0 | 1.2 | 1.4 | 1.5 | 1.8 | 2 | 2 | 1.9 |

Referring to Table 1, when the sharp grayscale correction value of the 24-grayscale is '10', the sharp grayscale correction value of the 32-grayscale is calculated as '12' by the adaptive offset ratio of the 32-grayscale that is '1.2' and the sharp grayscale correction value of the 8-grayscale is calculated as '6' by the adaptive offset ratio of the 8-grayscale that is '0.6'. Thus, the sharp grayscale correction value of the plurality of sample grayscales may be calculated based on the adaptive offset ratio (S112).

In an exemplary embodiment, as described above, the plurality of sharp grayscale correction values may be applied to the plurality of sample grayscales such that the plurality of corrected sample grayscales is displayed on the display apparatus in the horizontal Mura compensation mode and the vertical Mura compensation mode.

Referring to FIG. 4, a compensation intensity profile COMP_INT of the 24-grayscale compensated by the sharp grayscale correction value is gently decreased in the half-cut boundary area, in which the last pixel row (1079-th pixel row) of the upper area UA and the first pixel row (1080-th pixel row) of the lower area LA are located.

In such an embodiment, as described above, the sharp Mura compensation part 241 compensates the sharp horizontal Mura in the half-cut boundary area such that the sharp horizontal Mura is corrected to a normal Mura, which is sensible by the sensing part 220.

Then, the inspection control part 210 displays the plurality of corrected sample grayscales, which is corrected based on the plurality of sharp grayscale correction values respectively corresponding to the plurality of sample grayscales, on the display apparatus 100.

Figure 5:
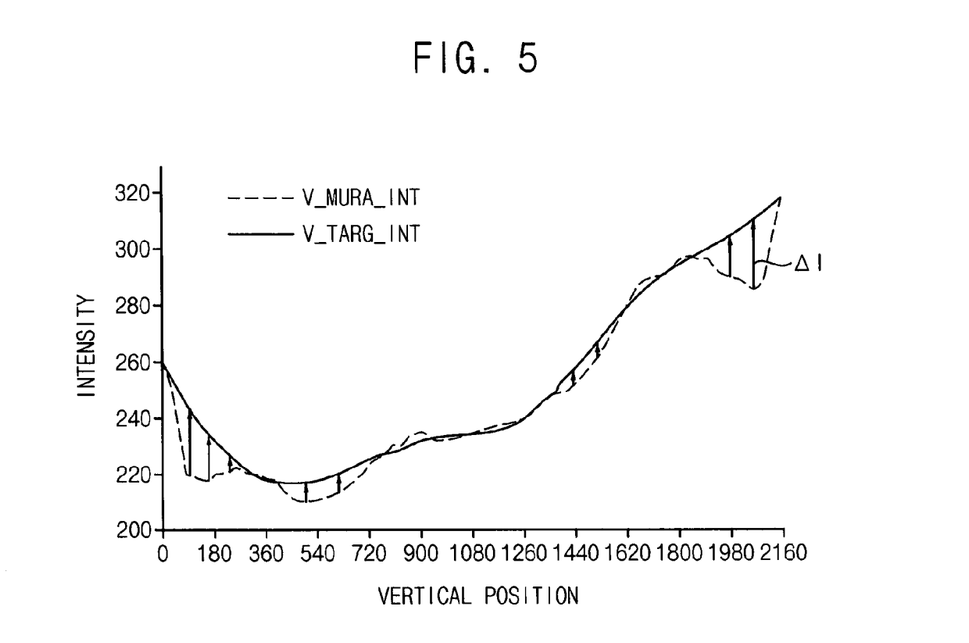
FIG. 5 is a conceptual diagram illustrating an intensity profile to explain an exemplary embodiment of a method of compensating a horizontal Mura of FIG. 3.
Figure 6:
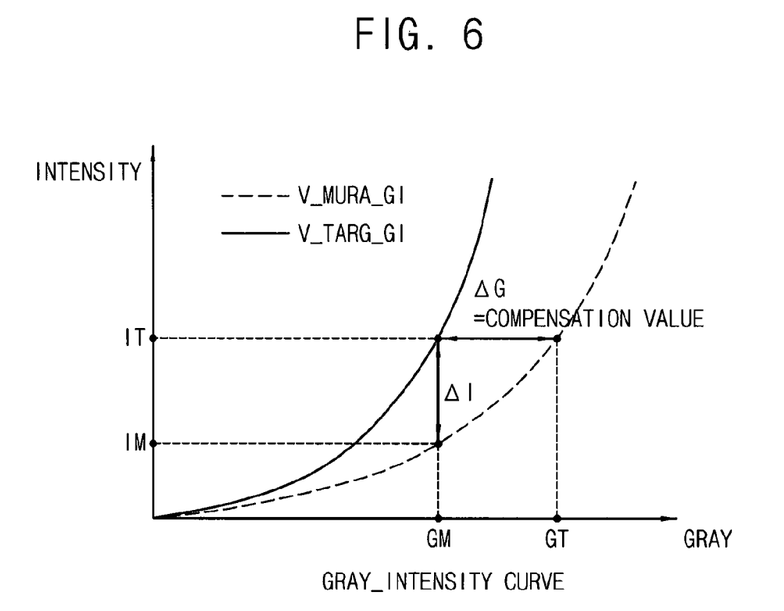
FIG. 6 is a conceptual diagram illustrating an exemplary embodiment of a method of calculating a vertical gray correction value of FIG. 3.

FIG. 5 is a conceptual diagram illustrating an intensity profile to explain an exemplary embodiment of a method of compensating a horizontal Mura of FIG. 3. FIG. 6 is a conceptual diagram illustrating an exemplary embodiment of a method of calculating a vertical gray correction value of FIG. 3.

Referring to FIGS. 1, 3, 5 and 6, an exemplary embodiment of a method of compensating the horizontal Mura (S130) will hereinafter be described.

The inspection control part 210 displays a corrected sample grayscale, that is, the sample grayscale corrected based on the sharp grayscale correction value, on the display apparatus 100. The sensing part 220 senses the corrected sample grayscale displayed on each vertical sample area (S120).

As shown in FIG. 5, the vertical intensity calculation part 242 calculates a vertical intensity profile V_MURA_INT and a vertical target intensity profile V_TARG_INT of a corrected sample grayscale using an intensity of the corrected sample grayscale sensed from the vertical sample area. The vertical target intensity profile V_TARG_INT may be calculated based on a 4-order polynomial approximation of the vertical intensity profile V_MURA_INT.

The vertical intensity calculation part 242 calculates the plurality of vertical intensity profiles and a plurality of vertical target intensity profiles corresponding to the plurality of corrected sample grayscales sensed from each vertical sample area (S131).

The vertical correction calculation part 243 calculates a grayscale-intensity curve of each vertical sample area to convert an intensity difference ΔI calculated by the vertical intensity profile V_MURA_INT and the vertical target intensity profile V_TARG_INT to a grayscale value.

In an exemplary embodiment, as shown in FIG. 6, the vertical correction calculation part 243 calculates a first Mura grayscale-intensity curve V_MURA_GI of each vertical sample area using the plurality of vertical intensity profiles corresponding to the plurality of corrected sample grayscales sensed from each vertical sample area. In such an embodiment, the vertical correction calculation part 243 calculates a first target grayscale-intensity curve V_TARG_GI of each vertical sample area using the plurality of vertical target intensity profiles corresponding to the plurality of corrected sample grayscales sensed from each vertical sample area.

The vertical correction calculation part 243 calculates the plurality of grayscale correction values corresponding to the plurality of corrected sample grayscales, using the first Mura grayscale-intensity curve V_MURA_GI and the first target grayscale-intensity curve V_TARG_GI calculated for each vertical sample area (S133).

Referring to the first Mura grayscale-intensity curve V_MURA_GI and the first target grayscale-intensity curve V_TARG_GI of FIG. 6, a Mura grayscale GM corresponding to the Mura intensity value IM is corrected to a target grayscale GT corresponding to the target intensity value IT such that a Mura intensity value IM is corrected to a target intensity value IT. The Mura grayscale GM has a grayscale correction value ΔG corresponding to a difference between the target grayscale GT and the Mura grayscale GM.

The addition part 244 adds the plurality of sharp grayscale correction values calculated from the sharp Mura compensation part 241 to the plurality of sharp grayscale correction values calculated from the vertical correction calculation part 243.

The addition part 244 adds the first and second sharp grayscale correction values to the grayscale correction values of the pixels corresponding to the last pixel row of the upper area and the first pixel row of the lower area among the pixels in the pixel column that overlaps the vertical position of each vertical sample area.

The addition part 244 adds the plurality of sharp grayscale correction values calculated for each vertical sample area to the plurality of grayscale correction values, and thus finally calculates the plurality of vertical grayscale correction values (S135).

The storage part 270 stores the plurality of vertical grayscale correction values corresponding to the plurality of sample grayscales sensed from each vertical sample area (S150).

Figure 7:
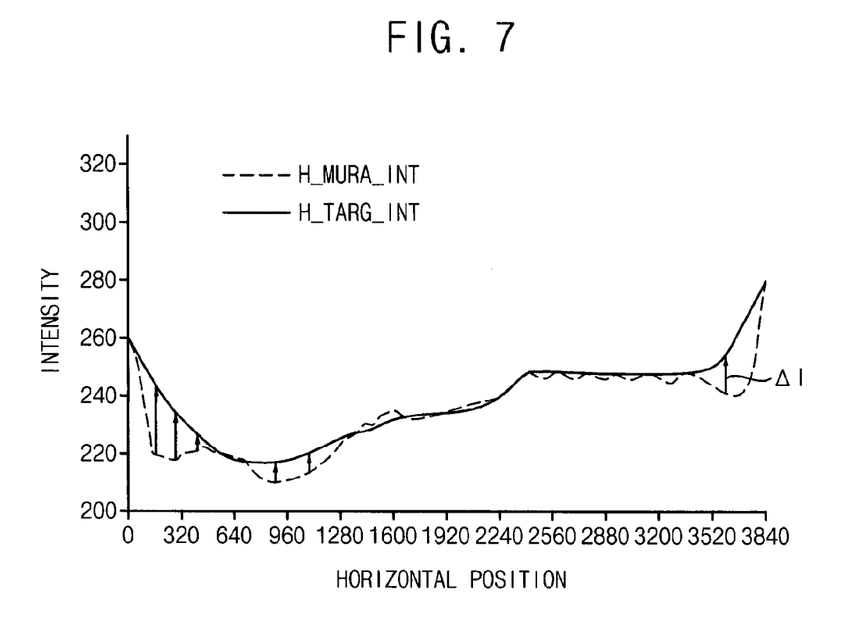
FIG. 7 is a conceptual diagram illustrating an intensity profile to explain an exemplary embodiment of a method of compensating a vertical Mura of FIG. 3.
Figure 8:
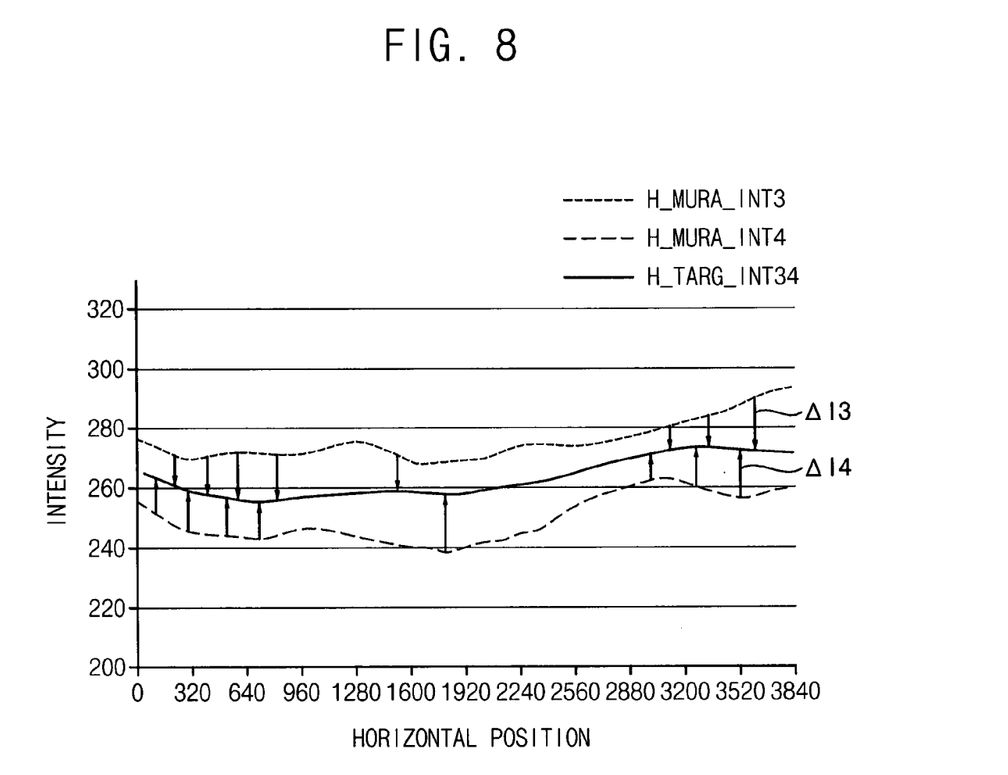
FIG. 8 is a conceptual diagram illustrating an intensity profile to explain an exemplary embodiment of a method of compensating a Mura in third and fourth horizontal sample areas of FIG. 2.

FIG. 7 is a conceptual diagram illustrating an intensity profile to explain an exemplary embodiment of a method of compensating a vertical Mura of FIG. 3. FIG. 8 is a conceptual diagram illustrating an intensity profile to explain an exemplary embodiment of a method of compensating a Mura in third and fourth horizontal sample areas of FIG. 2.

Referring to FIGS. 1, 3, 7 and 8, a method of compensating the vertical Mura (S140) will be described.

The inspection control part 210 displays the corrected sample grayscale, which is corrected by the sharp grayscale correction value, on the display apparatus 100. The sensing part 220 senses the corrected sample grayscale displayed on each vertical sample area (S120).

As shown in FIG. 7, the horizontal intensity calculation part 262 calculates a horizontal intensity profile H_MURA_INT and a horizontal target intensity profile H_TARG_INT of the corrected sample grayscale using an intensity of the corrected sample grayscale sensed from each horizontal sample area. The horizontal target intensity profile H_TARG_INT may be calculated based on a 4-order polynomial approximation of the horizontal intensity profile H_MURA_INT.

The horizontal intensity calculation part 262 calculates the plurality of horizontal intensity profiles and a plurality of horizontal target intensity profiles corresponding to the plurality of corrected sample grayscales sensed from each horizontal sample area (S141).

The horizontal correction calculation part 263 calculates a grayscale-intensity curve of each horizontal sample area to convert an intensity difference ΔI calculated by the horizontal intensity profile H_MURA_INT and the horizontal target intensity profile H_TARG_INT to a grayscale value.

In an exemplary embodiment, the horizontal correction calculation part 263 calculates a second Mura grayscale-intensity curve H_MURA_GI of each horizontal sample area, using the plurality of horizontal intensity profiles corresponding to the plurality of corrected sample grayscales sensed from each horizontal sample area. In such an embodiment, the horizontal correction calculation part 263 calculates a second target grayscale-intensity curve H_TARG_GI of each horizontal sample area, using the plurality of horizontal target intensity profiles corresponding to the plurality of corrected sample grayscales sensed from each horizontal sample area.

Although not shown in figures, the horizontal correction calculation part 263 calculates the plurality of horizontal grayscale correction values corresponding to the plurality of corrected sample grayscales, using the second Mura grayscale-intensity curve H_MURA_GI and the second target grayscale-intensity curve H_TARG_GI calculated for each horizontal sample area (S143).

In an exemplary embodiment, as shown in FIG. 2, the horizontal grayscale correction values respectively corresponding to the first, second, fifth and sixth horizontal sample areas HA1, HA2, HA5 and HA6 are calculated using the horizontal target intensity profiles, which are different from each other, calculated for each horizontal sample area.

In such an embodiment, the horizontal grayscale correction values of the third and fourth horizontal sample areas HA3 and HA4 adjacent to the half-cut boundary area are calculated using a same horizontal target intensity profile such that the sidedness intensity difference may be decreased.

Referring to FIG. 8, the horizontal intensity calculation part 262 calculates a horizontal intensity profile H_MURA_INT3 of the third horizontal sample area HA3 using the corrected sample grayscale sensed from the third horizontal sample area HA3.

The horizontal intensity calculation part 262 calculates a horizontal intensity profile H_MURA_INT4 of the fourth horizontal sample area HA4 using the corrected sample grayscale sensed from the fourth horizontal sample area HA4.

The horizontal intensity calculation part 262 calculates a horizontal target intensity profile H_TARG_INT34 using an average intensity profile of the horizontal intensity profile H_MURA_INT3 and the horizontal intensity profile H_MURA_INT4.

The vertical correction calculation part 263 calculates a horizontal grayscale correction value of the third horizontal sample area HA3 using an intensity difference ΔI3 calculated by the horizontal intensity profile H_MURA_INT3 and the horizontal target intensity profile H_TARG_INT34. The vertical correction calculation part 263 calculates a horizontal grayscale correction value of the fourth horizontal sample area HA4 using an intensity difference ΔI4 calculated by the horizontal intensity profile H_MURA_INT4 and the horizontal target intensity profile H_TARG_INT34 (S143).

Therefore, in such an embodiment, the intensity difference between the third horizontal sample area HA3 of the upper area UA and the fourth horizontal sample area HA4 of the lower area LA may be decreased such that the sidedness intensity difference may be decreased.

The storage part 270 stores the plurality of horizontal grayscale correction values corresponding to the plurality of sample grayscales sensed from each horizontal sample area (S150)

Figure 9:
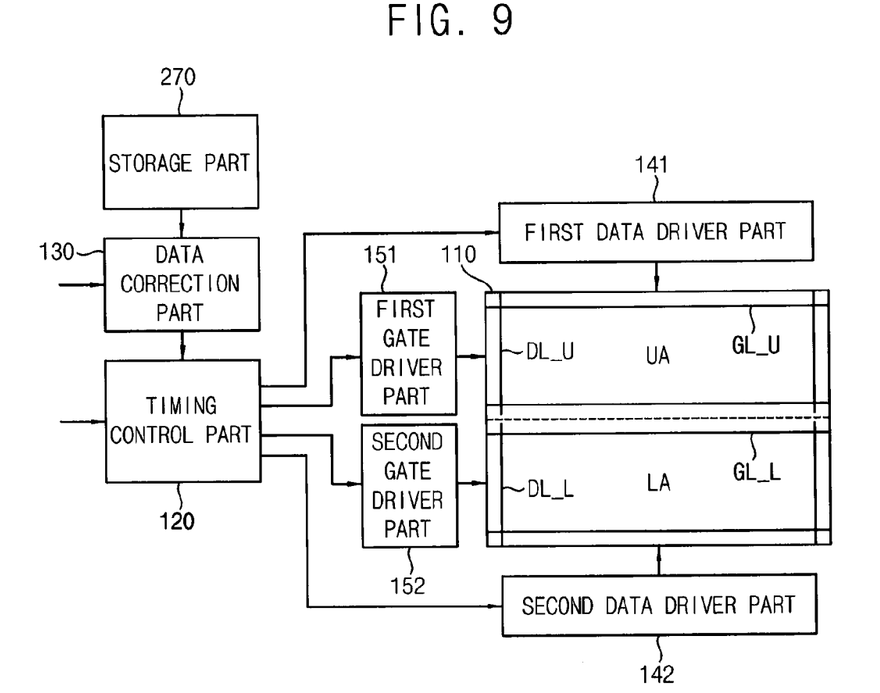
FIG. 9 is a block diagram illustrating an exemplary embodiment of a display apparatus according to the invention.
Figure 10:
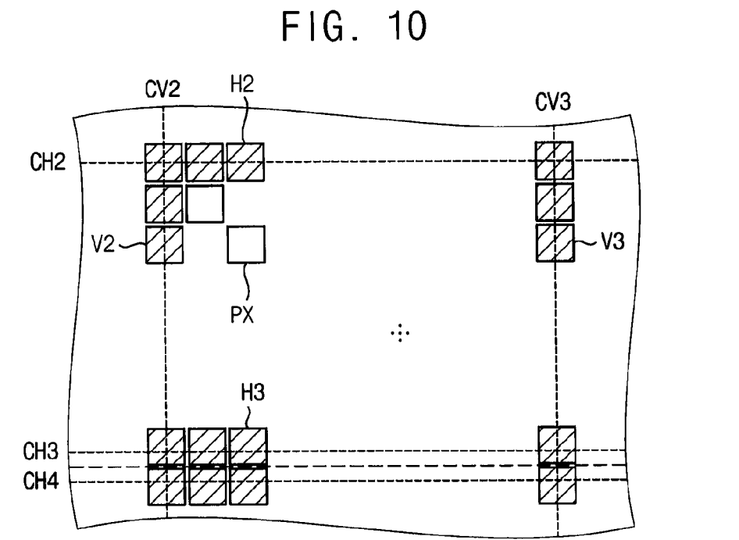
FIG. 10 is a conceptual diagram illustrating an exemplary embodiment of a method of correcting grayscale data using a data correction part of FIG. 9.

FIG. 9 is a block diagram illustrating an exemplary embodiment of a display apparatus according to the invention. FIG. 10 is a conceptual diagram illustrating an exemplary embodiment of a method of correcting grayscale data using a data correction part of FIG. 9.

Referring to FIGS. 9 and 10, an exemplary embodiment of the display apparatus may include a display panel 110, a timing control part 120, a storage part 270, a data correction part 130, a first data driver part 141, a first gate driver part 151, a second data driver part 142 and a second gate driver part 152.

The display panel 110 includes a plurality of data lines DL_U and DL_L and a plurality of gate lines GL_U and GL_L crossing the data lines DL_U and DL_L.

The display panel 110 has a resolution of a UHD, for example, a resolution of 3840×2160.

A data line connected to pixels in a same pixel column includes an upper data line DL_U, which is disposed in an upper area UA, and a lower data line DL_L, which is disposed in a lower area LA and is spaced apart from the upper data line DL_U.

The timing control part 120 generates a plurality of timing control signals to control an operation of the display apparatus based on an original control signal.

The storage part 270 stores the vertical grayscale correction value and the horizontal grayscale correction value calculated by the vision inspection apparatus of FIG. 1. Referring to FIG. 2, the storage part 270 may store {P×M+ Q×N}×K grayscale correction values. Herein, P denotes the number of the vertical sample areas, M denotes the number of the pixels in a pixel column, Q denotes the number of the horizontal sample areas, N denotes the number of the pixels in a pixel row, and K denotes the number of the sample grayscales.

The data correction part 130 corrects grayscale data using the grayscale correction value stored in the storage part 270 and generates correction grayscale data. The display panel 110 is driven by the correction grayscale data, which is corrected based on the grayscale correction value, such that an image, which is compensated to reduce or remove sharp horizontal Mura, horizontal line Mura, vertical line Mura and sidedness intensity difference and so on, may be displayed on the display panel 110. Hereinafter, an exemplary embodiment of a method of correcting the grayscale data will be described.

The first data driver part 141 drives the upper data line DL_U which is disposed in the upper area UA of the display panel 110.

The first gate driver part 151 drives the upper gate line GL_U which is disposed in the upper area UA of the display panel 110.

The second data driver part 142 drives the lower data line DL_L which is disposed in the lower area LA of the display panel 110.

The second gate driver part 152 drives the lower gate line GL_L which is disposed in the lower area LA of the display panel 110.

In an exemplary embodiment, referring to FIGS. 2, 9 and 10, the data correction part 130 corrects the grayscale data corresponding to the pixels of the display panel 110 using the vertical grayscale correction values of a plurality of vertical positions CV1, . . . , CV9 and the horizontal grayscale correction values of a plurality of horizontal positions CH1, . . . , CH6 stored in the storage part 270.

In such an embodiment, the data correction part 130 corrects the grayscale data of the pixels V2 and V3 located on the vertical positions CV2 and CV3 using the vertical grayscale correction values of the vertical positions CV1, . . . , CV9 stored in the storage part 270 to generate the correction grayscale data of the pixels V2 and V3.

In such an embodiment, the data correction part 130 the grayscale data of the pixels H2 and H3 located on the horizontal positions CH2 and CH3 using the vertical grayscale correction values of the horizontal positions CH1, . . . , CH6 stored in the storage part 270 to generate the correction grayscale data of the pixels H2 and H3.

The data correction part 130 corrects the grayscale data of the pixel PX located between adjacent vertical positions CV2 and CV3 and between adjacent horizontal positions CH2 and CH3 through a linear interpolation using the horizontal grayscale correction values and the vertical grayscale correction values to generate the correction grayscale data of the pixel PX.

In one exemplary embodiment, for example, as shown in FIG. 10, the pixel PX may be located between the vertical positions CV2 and CV3 and between the horizontal positions CH2 and CH3.

The data correction part 130 determines second and third vertical positions CV2 and CV3 adjacent to the pixel PX, determines a grayscale correction value V2 of a same pixel row as the pixel PX among the grayscale correction values of the second vertical position CV2, and determines a grayscale correction value V3 of a same pixel row as the pixel PX among the grayscale correction values of the third vertical position CV3. The data correction part 130 calculates a vertical interpolation grayscale correction value of the pixel PX through the linear interpolation using the grayscale correction values V2 and V3 of determined vertical positions CV2 and CV3.

Then, the data correction part 130 determines second and third horizontal positions CH2 and CH3 adjacent to the pixel PX, determines a grayscale correction value H2 of a same pixel row as the pixel PX among the grayscale correction values of the second horizontal position CH2, and determines a grayscale correction value H3 of a same pixel row as the pixel PX among the grayscale correction values of the third horizontal position CH3. The data correction part 130 calculates a horizontal interpolation grayscale correction value of the pixel PX through the linear interpolation using the grayscale correction values H2 and H3 of determined horizontal positions CH2 and CH3.

The data correction part 130 adds the vertical interpolation grayscale correction value to and horizontal interpolation grayscale correction value such that the grayscale correction value of the pixel PX is generated. The data correction part 130 applies the grayscale correction value of the pixel PX to the grayscale data of the pixel PX such that the correction grayscale data of the pixel PX is generated.

As described above, in such an embodiment, the display apparatus may correct the grayscale data of the pixel using the vertical and horizontal grayscale correction values calculated by the vision inspection apparatus.

According to exemplary embodiments of the invention, the sharp horizontal Mura and the sidedness intensity difference, which occur in the half-cut boundary area of the display apparatus having the UHD, may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of compensating a Mura defect of a display apparatus which comprises a display area divided into an upper area and a lower area, which are driven independently of each other, the method comprising:
   calculating a sharp grayscale correction value of a predetermined sample grayscale displayed on the display apparatus, wherein the sharp grayscale correction value is configured to compensate a sharp horizontal Mura in a boundary area between the upper and lower areas;
   displaying a corrected sample grayscale on the display apparatus based on the predetermined sample grayscale and the sharp grayscale correction value;
   sensing the corrected sample grayscale displayed on each of a plurality of sample areas, wherein the sample areas are defined on the display area based on a Mura type;
   calculating an intensity profile of the corrected sample grayscale and a target intensity profile which is configured to compensate the intensity profile of the corrected sample grayscale;
   calculating a grayscale correction value of the sample area using the intensity profile and the target intensity profile; and
   applying the sharp grayscale correction value to the grayscale correction value.

2. The method of compensating Mura of claim 1, wherein the calculating the sharp grayscale correction value displayed on the display apparatus comprises:
   sensing the predetermined sample grayscale displayed on each sample area, and sensing an adjacent sample grayscale of the predetermined sample grayscale displayed on each sample area; and
   calculating the sharp grayscale correction value of the predetermined sample grayscale using an intensity value of the predetermined sample grayscale, an intensity value of the adjacent sample grayscale, a piecewise gamma between the predetermined sample grayscale and the adjacent sample grayscale, and a target intensity value.

3. The method of compensating Mura of claim 2, wherein the calculating the sharp grayscale correction value using the intensity value of the predetermined sample grayscale, the intensity value of the adjacent sample grayscale, the piecewise gamma between the predetermined sample grayscale and the adjacent sample grayscale, and the target intensity value comprises:
   calculating a first sharp grayscale correction value corresponding to a last pixel row of the upper area by setting the target intensity value as an average intensity value of pixels in a pixel row of the upper area adjacent to the last pixel row of the upper area; and
   calculating a second sharp grayscale correction value corresponding to the last pixel row of the upper area by setting the target intensity value as an average intensity value of pixels in a pixel row of the lower area adjacent to a first pixel row of the lower area.

4. The method of compensating Mura of claim 2, wherein the calculating the sharp grayscale correction value using the intensity value of the predetermined sample grayscale, the intensity value of the adjacent sample grayscale, the piecewise gamma between the predetermined sample grayscale and the adjacent sample grayscale, and the target intensity value further comprises:
   calculating a sharp grayscale correction value of another sample grayscale, which is different from the predetermined sample grayscale, using an adaptive offset ratio with respect to the predetermined sample grayscale.

5. The method of compensating Mura of claim 1, wherein the sample areas comprise a plurality of vertical sample areas and a plurality of horizontal sample areas, and the sensing the corrected sample grayscale displayed on each of the sample areas comprises:
   sensing the corrected sample grayscale displayed on each of the vertical sample areas; and
   sensing the corrected sample grayscale displayed on each of the horizontal sample areas.

6. The method of compensating Mura of claim 5, wherein the sharp grayscale correction value is calculated for each vertical sample area.

7. The method of compensating Mura of claim 5, wherein the calculating the intensity profile of the corrected sample grayscale and the target intensity profile comprises calculating a vertical intensity profile of the corrected sample grayscale sensed from each vertical sample area and a vertical target intensity profile which is configured to compensate the vertical intensity profile, and
   the calculating the grayscale correction value of the sample area using the intensity profile and the target intensity profile comprises calculating a vertical grayscale correction value based on the vertical intensity profile and the vertical target intensity profile.

8. The method of compensating Mura of claim 7, wherein the vertical grayscale correction value comprises grayscale correction values of pixels in a pixel column, and
   the applying the sharp grayscale correction value comprises:
   adding a first sharp grayscale correction value to a grayscale correction value of a pixel in a last pixel row of the upper area; and
   adding a second sharp grayscale correction value to a grayscale correction value of a pixel in a first pixel row of the lower area.

9. The method of compensating Mura of claim 5, wherein the calculating the intensity profile of the corrected sample grayscale and the target intensity profile comprises calculating a horizontal intensity profile of the corrected sample grayscale sensed from each horizontal sample area and the horizontal target intensity profile which is configured to compensate the horizontal intensity profile, and
   the calculating the grayscale correction value of the sample area using the intensity profile and the target intensity profile comprises calculating a horizontal grayscale correction value based on the horizontal intensity profile and the horizontal target intensity profile.

10. The method of compensating Mura of claim 9, wherein
    a horizontal sample area adjacent to the boundary area between the upper and lower areas has a size smaller than a size of a horizontal sample area distant from the boundary area.

11. The method of compensating Mura of claim 10, wherein the calculating the horizontal grayscale correction value based on the horizontal intensity profile and the horizontal target intensity profile comprises:

calculating horizontal grayscale correction values of a first horizontal sample area in the upper area adjacent to the boundary area and a second horizontal sample area in the lower area adjacent to the boundary area, based on a same horizontal target intensity profile, wherein the horizontal grayscale correction value comprises grayscale correction values of pixels in a pixel row.

12. A vision inspection apparatus comprising:

a sensing part configured to sense a sample grayscale displayed on a display apparatus, wherein the display apparatus comprises a display area divided into an upper area and a lower area, which are driven independently of each other;

a sharp Mura compensation part configured to calculate a sharp grayscale correction value of a predetermined sample grayscale, wherein the sharp grayscale correction value is configured to compensate a sharp horizontal Mura in a boundary area between the upper and lower areas;

an inspection control part configured to control the sensing part to sense the sample grayscale displayed on each of a plurality of sample areas defined on the display area based on a Mura type and to display a corrected sample grayscale on the display apparatus based on the predetermined sample grayscale and the sharp grayscale correction value;

an intensity calculation part configured to calculate an intensity profile of the corrected sample grayscale and a target intensity profile which is configured to compensate the intensity profile of the corrected sample grayscale;

a correction calculation part configured to calculate a grayscale correction value of the sample area using the intensity profile and the target intensity profile; and an addition part configured to add the sharp grayscale correction value to the grayscale correction value.

13. The vision inspection apparatus of claim 12, wherein the sharp Mura compensation part is configured to calculate the sharp grayscale correction value of the predetermined sample grayscale using an intensity value of the predetermined sample grayscale, an intensity value of the adjacent sample grayscale, a piecewise gamma between the predetermined sample grayscale and the adjacent sample grayscale, and a target intensity value.

14. The vision inspection apparatus of claim 13, wherein the sharp Mura compensation part is configured to calculate a first sharp grayscale correction value corresponding to a last pixel row of the upper area by setting the target intensity value as an average intensity value of pixels in a pixel row of the upper area adjacent to the last pixel row of the upper area, and the sharp Mura compensation part is configured to calculate a second sharp grayscale correction value corresponding to the last pixel row of the upper area by setting the target intensity value as an average intensity value of pixels in a pixel row of the lower area adjacent to a first pixel row of the lower area.

15. The vision inspection apparatus of claim 14, wherein the sharp Mura compensation part is configured to calculate a sharp grayscale correction value of another sample grayscale, which is different from the predetermined sample grayscale, using an adaptive offset ratio with respect to the predetermined sample grayscale.

16. The vision inspection apparatus of claim 14, wherein the sample areas comprise a plurality of vertical sample areas, the intensity calculation part is configured to calculate a vertical intensity profile of the corrected sample grayscale sensed from each vertical sample area and a vertical target intensity profile which is configured to compensate the vertical intensity profile ; and the correction calculation part is configured to calculate a vertical grayscale correction value based on the vertical intensity profile and the vertical target intensity profile.

17. The vision inspection apparatus of claim 16, wherein the vertical grayscale correction value comprises grayscale correction values of pixels in a pixel column, and the addition part is configured to add a first sharp grayscale correction value to a grayscale correction value of a pixel in a last pixel row of the upper area, and add a second sharp grayscale correction value to a grayscale correction value of a pixel in a first pixel row in the lower area.

18. The vision inspection apparatus of claim 14, wherein the sample areas comprise a plurality of horizontal sample areas, the intensity calculation part is configured to calculate a horizontal intensity profile of the corrected sample grayscale sensed from each horizontal sample area and the horizontal target intensity profile which is configured to compensate the horizontal intensity profile; and the correction calculation part is configured to calculate a horizontal grayscale correction value based on the horizontal intensity profile and the horizontal target intensity profile.

19. The vision inspection apparatus of claim 18, wherein a horizontal sample area adjacent to the boundary area between the upper and lower areas has a size smaller than a size of a horizontal sample area distant from the boundary area.

20. The vision inspection apparatus of claim 18, wherein the correction calculation part is configured to calculate horizontal grayscale correction values of a first horizontal sample area of the upper area adjacent to the boundary area and a second horizontal sample area of the lower area adjacent to the boundary area, based on a same horizontal target intensity profile.

* * * * *